No. 624,040. Patented May 2, 1899.
C. B. JACOBS.
PROCESS OF REDUCING METALS FROM THEIR SOLUTIONS.
(Application filed June 21, 1898.)
(No Model.)
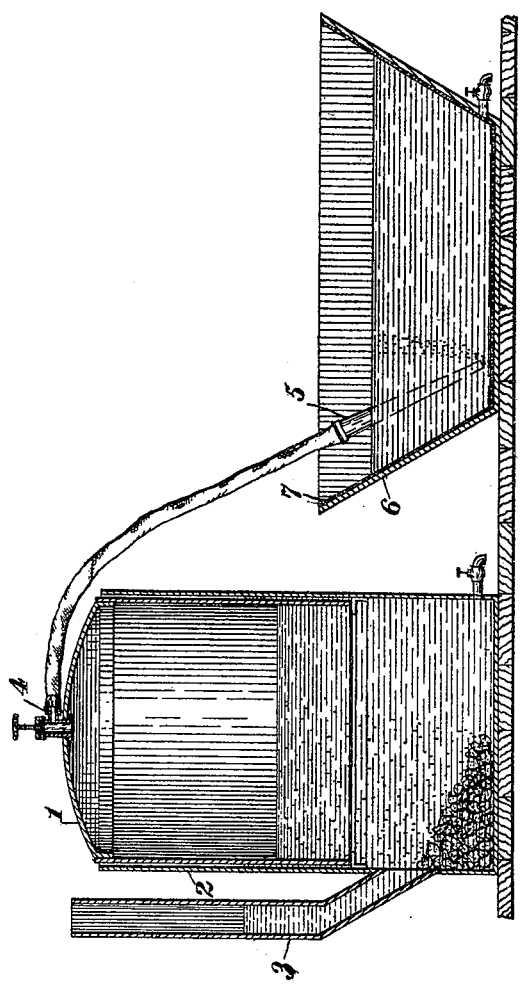
WITNESSES:
Geo. B. Rowley
Elizabeth Ewing
INVENTOR
Charles B. Jacobs
BY
HIS ATTORNEY

UNITED STATES PATENT OFFICE.

CHARLES BORROWS JACOBS, OF EAST ORANGE, NEW JERSEY, ASSIGNOR TO THE AMPERE ELECTRO-CHEMICAL COMPANY, OF SAME PLACE.

PROCESS OF REDUCING METALS FROM THEIR SOLUTIONS.

SPECIFICATION forming part of Letters Patent No. 624,040, dated May 2, 1899.

Application filed June 21, 1898. Serial No. 684,188. (No specimens.)

*To all whom it may concern:*

Be it known that I, CHARLES BORROWS JACOBS, a citizen of the United States, and a resident of East Orange, county of Essex, State of New Jersey, have invented certain new and useful Improvements in Processes of Reducing Metals from their Solutions, of which the following is a specification.

This invention relates to the reduction of gold, silver, and other metals from their solutions by a novel treatment with hydrogen phosphide.

The invention depends for its controlling principle upon the powerful reducing action of gaseous phosphide of hydrogen, particularly on solutions containing the noble metals. The gaseous precipitant is produced by putting calcium phosphide into water and collecting the phosphide of hydrogen thereby produced in a gas-holder, from which it is led and distributed throughout the solution by any suitable apparatus. I have found that the precipitation of gold and silver is much more rapid and the precipitate of a coarser nature and therefore much better adapted for subsequent collection and separation from other precipitates of the baser metals when the solution contains free alkali or alkaline materials. In order to facilitate a collection of the precipitate, I line the tank in which the reduction takes place with a removable flexible material, by which the precipitated metal may be more easily collected for subsequent treatment. This lining is preferably of a porous character, so that the liquid may be filtered off after its removal from the tank.

My invention therefore comprises a method of precipitating and reducing the noble metals from solutions containing them by treating said solutions, and particularly cyanid solutions, with phosphide of hydrogen, and, further, in adding an alkaline material to the solutions to prevent acidity during the reduction.

It comprises other more specific features, which will be hereinafter more fully described, and will be definitely indicated in the claims appended to this specification.

The accompanying drawing illustrates an apparatus for carrying out my method. It comprises a telescope gas-holder formed of galvanized iron or steel in two sections 1 and 2, arranged to telescope together, brackets being mounted upon the inside of the stationary portion 2 to form a support for the movable portion 1 when it reaches its lowest position. From the stationary member of the tank at a point near the bottom extends a spout 3, and from the top of the movable member leads a pipe 4, controlled by a stop-cock, from which gas may be led through a flexible pipe to a distributing-tube 5, from which the gas may be distributed through the solution contained in a tank 6. The tank 6 is lined with a flexible material, such as canvas, (indicated at 7.) Phosphide of calcium, which may be cheaply made by a process described in a patent application filed by me and pending concurrently herewith, Serial No. 679,760, may be introduced into the gas-holder through the spout 3 and will be slowly decomposed by the water into calcium hydrate and hydrogen phosphide, which latter collects in the space above the tank and gradually displaces the water with which the tank is filled at the commencement of the operation. In the tank 6 is placed a solution of silver or gold, or both. The chief field of use of the process lies in the reduction of gold and silver from solutions made by treatment of suitable ores with cyanid of potassium or by the chlorination process. During the reaction of the gas upon the solution the latter is preferably made alkaline, which greatly facilitates the precipitation of the metals and shortens the process, as well as causing the precipitate to be coarser, and therefore more easily managed.

The reactions which take place with the various solutions are as follows:

With chlorid-of-gold solution:

$$4AuCl_3 + 2PH_3 = 2PCL_3 + 6HCl + 4Au.$$

With cyanid of gold:

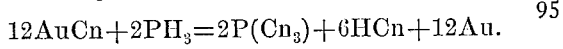
$$12AuCn + 2PH_3 = 2P(Cn_3) + 6HCn + 12Au.$$

With double cyanid of potassium and gold:

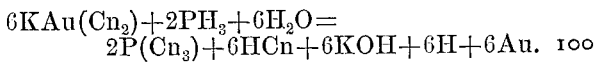
$$6KAu(Cn_2) + 2PH_3 + 6H_2O = 2P(Cn_3) + 6HCn + 6KOH + 6H + 6Au.$$

With silver nitrate:

$$8AgNO_3 + PH_3 + 4H_2O = 8HNO_3 + H_3PO_4 + 8Ag.$$

With silver cyanid:

$$12AgCn + 2PH_3 = 2P(Cn) + 6HCn + 12Ag.$$

In all of the reactions an alkali and preferably an alkaline carbonate is added to the solution, as I find such a condition causes a more rapid precipitation and brings down the precipitate in a denser form, permitting more easy separation of the metals by subsequent treatment. Besides this the presence of an alkali or alkaline carbonate permits regeneration of the cyanid, which may then again be used on the ore. The reaction of the gas generates hydrocyanic acid, and this combines with the alkali thus:

$$2HCn + K_2CO_3 = 2KCn + H_2O + CO_2.$$

$$HCn + KOH = KCn + H_2O.$$

Base metals—such as lead, copper, antimony, zinc, iron, &c., which may be present in the same solution—are thrown down as phosphides, which may be separated from the noble metals by means of suitable fluxes. I prefer to line the tank with cloth or canvas of very fine mesh to trap the precipitate and permit the liquid to drain off. During the operation sample tests should be taken from time to time, and when all the gold and silver has been thrown down the gas may be turned off and the canvas containing the precipitate removed from the tank. The precipitates are then washed with water and dried and then mixed with carbonate or bicarbonate of soda, borax, and niter in suitable proportions to produce a liquid slag when melted in clay or graphite crucibles. The phosphides of the base metals are decomposed and taken up in the slag, whereas the noble metals are unaffected and fuse together into a button in the bottom of the crucible. If both gold and silver are present in the solution treated, the button may be further treated for the separation of the gold from the silver in well-understood ways. One of the principal advantages of this process is that it broadens the scope of the cyanid and the chlorination processes and permits their application to ores which are not now adapted for such treatment. In the process now commonly used, in which zinc or ferrous sulfate is used as the precipitant, great pains must be taken to prevent the solution from becoming alkaline and contaminating the product with zinc or iron by reaction of the alkaline solution on the zinc or ferrous sulfate. With my process, however, the base metals are thrown down in the form of easily-separated phosphides, whereas only the noble metals are precipitated in the metallic state. Moreover, much greater rapidity of action is secured and a more perfect extraction of the metals than is possible with either zinc-turnings or ferrous sulfate, one pound of calcium phosphide furnishing sufficient gas to reduce one hundred and thirty-seven ounces of gold from its chlorid solution, one hundred and ninety-two ounces from the cyanid solution, ninety-six ounces from a potassium-cyanid solution, one hundred and fifty ounces of silver from its nitrate solution, and one hundred and eighteen ounces of silver from its cyanid solution. Moreover, the precipitate is purer than in the process now in use, since it is uncontaminated with zinc or other metallic impurities introduced by the precipitant. The extraction is also more perfect, since the most delicate test after a sufficient exposure to the action of the gas fails to detect the presence of noble metals in the solution. If base metals are present in the solutions, a larger consumption of gas (and therefore calcium phosphide) is necessary by reason of the compounds of the base metals formed as above noted.

Having thus described my invention, what I claim as new, and desire to secure by Letters Patent, is—

1. The process of reducing metals from their solutions consisting in subjecting them to gaseous hydrogen phosphide in the presence of an alkali or alkaline material.

2. The process of reducing the noble metals from their cyanid solutions consisting in subjecting them to the action of gaseous phosphide of hydrogen in the presence of an alkaline material.

3. The process of precipitating the noble metals from their cyanid solutions consisting in adding an alkaline material and then subjecting the solution to the action of gaseous phosphide of hydrogen.

4. The process of reducing metals from their solutions consisting in subjecting them to the action of gaseous phosphide of hydrogen in the presence of an alkaline material thereby precipitating the noble metals in a metallic state and the base metals as phosphides, and then separating the latter from the noble metals.

In testimony whereof I have hereunto subscribed my name this 28th day of May, A. D. 1898.

CHARLES BORROWS JACOBS.

Witnesses:
ROBT. H. READ,
ELIZABETH EWING.